May 10, 1960 J. J. SUOZZI 2,936,414

MAGNETIC AMPLIFIER WITH TRANSISTOR INPUT AND FEEDBACK CIRCUIT

Filed May 19, 1955 2 Sheets-Sheet 1

INVENTOR

J. J. SUOZZI

BY

ATTORNEYS

May 10, 1960 J. J. SUOZZI 2,936,414

MAGNETIC AMPLIFIER WITH TRANSISTOR INPUT AND FEEDBACK CIRCUIT

Filed May 19, 1955 2 Sheets-Sheet 2

INVENTOR
J. J. SUOZZI

BY

G. D. O'Brien
W. O. Quesenberry
ATTORNEYS

United States Patent Office 2,936,414

Patented May 10, 1960

2,936,414

MAGNETIC AMPLIFIER WITH TRANSISTOR INPUT AND FEEDBACK CIRCUIT

Joseph J. Suozzi, Washington, D.C., assignor to the United States of America as represented by the Secretary of the Navy Application May 19, 1955, Serial No. 509,704

17 Claims. (Cl. 323—89)

(Granted under Title 35, U.S. Code (1952), sec. 266)

The invention described herein may be manufactured and used by or for the Government of the United States of America for governmental purposes without the payment of any royalties thereon or therefor.

The present invention relates to magnetic amplifiers adaptable for use in servo systems and more particularly pertains to half-wave magnetic amplifier bridge arrangements utilizing the combination of electron discharge devices or transistors in the input control circuit thereof to enable the provision of a high impedance input circuit whereby improved gain is obtained, and a feedback circuit from the servo motor for introducing a negative feedback signal into the input control circuit along with the control signal to provide a damping potential for the servo motor unit.

Instrument servos generally use a two-phase induction motor as the power drive and synchro units for error detection. It is thus necessary that the servo amplifier be capable of receiving a phase reversible D.C. or A.C. signal and delivering a phase reversible D.C. or A.C. output, the magnitude and phase of which output is correlative with the amplitude and phase of the input signal. In order to achieve the minimum speed of response in the magnetic amplifier which is required for high-performance servo-system applications, half-wave circuitry is preferably utilized, which circuitry can be made to have an inherent speed of response of one cycle of the supply or carrier frequency. By employing bridge-type half-wave circuitry, an output voltage correlative in magnitude and phase with the amplitude and phase of the input signal is obtained. The output of the bridge-type half-wave magnetic amplifier, although unidirectional for any given phase sense input, is a signal having a wave-form which contains a high fundamental A.C. component, which component may be utilized to operate either a D.C. load or an A.C. load such as a phase reversible A.C. induction motor of the type conventionally used in instrument servos.

Heretofore, it has been known to utilize half-wave reference or biasing circuits in conjunction with half-wave bridge magnetic amplifiers to establish the proper operating flux level in the saturable reactor cores during the nonconducting half-cycle of the bridge and to utilize a separate control circuit energized by a control signal source to provide the incremental control flux in the cores during the non-conducting half-cycle of the bridge. Such an arrangement thus necessitates separate control and reference windings on the saturable reactor elements.

Also, in servo systems employing half-wave magnetic amplifiers, it is generally desirable that the input control circuit of the magnetic amplifier present a high impedance to the error signal source to prevent loading down of the error signal source. However, restrictions are imposed on the magnitude of the input control circuit impedance that can be used since magnetic amplifiers are characterized by an inherently low impedance and hence require a low impedance in the input control circuit in order to obtain an output displaying any gain. In view of this fact, prior art magnetic amplifiers employed in the input circuit thereof as high an impedance, but yet relatively low, as was permissible and compensated for the low gain obtained by utilizing a plurality of magnetic amplifier stages in succession to obtain the required or desired gain to drive the servo motor. As an example of this problem, it is known that the control transformers generally employed for coupling the error signal source to the input control circuit of the magnetic amplifier have an internal impedance of 800 to 1000 ohms and require to look into at least an impedance of the order of ten times the internal impedance, i.e. 8,000 to 10,000 ohms, to prevent loading down of the control transformer. Although it is desirable in order to obtain improved gain to use an impedance in the control circuit of the magnetic amplifier of the order of 10 to 100 times the internal impedance of the control transformer, it has been found in prior art magnetic amplifier arrangements that, if an input impedance in excess of 10 times the internal impedance of the control transformer is attempted to be used, the amplification factor of the magnetic amplifier is adversely affected due to the inherent low impedance of the magnetic amplifier. Consequently, prior art magnetic amplifiers have employed an input impedance of about 10,000 ohms and amplified the signal through several successive magnetic amplifier stages to obtain a signal of sufficient magnitude to drive the motor.

It is also frequently necessary, in servo systems, to damp the servo motor. Heretofore, this has been achieved by use of a separate tachometer or some type of feedback network which generally has been found to be inadequate.

The general purpose of this invention is to provide a magnetic amplifier arrangement wherein a single input control circuit serves as both the bias circuit and the control circuit and which arrangemetn is capable of utilizing a high impedance in the input control circuit with no deleterious effects so as to obtain with a less number of stages the same gain as obtained with conventional magnetic amplifiers, and which arrangement further employs an improved feedback damping circuit that eliminates the necessity of a tachometer or separate feedback circuit for damping purposes.

The present invention provides a new and improved bridge-type half-wave magnetic amplifier arrangement for servo systems wherein electron discharge devices or transistors are connected in series through variable resistors to the control windings to form an input control circuit for the bridge amplifier and in which circuit the control and reference flux is established by a single control winding on each of the saturable core reactors, the input control circuit being connected across the A.C. power supply source. The electron discharge devices or transistors are so arranged as to pass current therethrough during the non-conducting half-cycle of the bridge to thereby supply half-wave currents to the control windings on the bridge and establish the proper operating flux level in the cores. The control signal is applied to the control electrodes of the electron discharge devices or of the transistors to vary the current flow therethrough and thus vary the flux set in the cores during the flux setting half-cycle of the bridge. The inherent amplifying characteristics of the tubes is such that a small change in control potential on the control electrodes produces a large change in current flow through the discharge devices or transistors whereby the amplification of the stage of the magnetic amplifier is greatly increased. Furthermore, inclusion of electron discharge devices or transistors in the control circuit acts to isolate the control windings from the control source and thus prevents the flow of circulating currents through the latter due to voltage induced in the control windings by current flowing through the load windings of the bridge.

Use of electron discharge devices or transistors in the input stage permits the adjustment of the variable resistors to a relatively high value, which is a desirable feature in the prevention of loading down the error signal source, with the result that not only is there no adverse effect on the amplifying factor of the magnetic amplifier but, instead, the gain of the amplifier is enhanced. The electron discharge devices may be vacuum tubes of the triode, tetrode or pentode type or may be transistors. With vacuum tubes connected in the control circuit of the magnetic amplifier, the variable resistors in the control circuit may be adjusted so that the control circuit presents to the control transformer an impedance of the order of 10 to 100 times the internal impedance of the control transformer; whereas, with transistors, the variable resistors can be adjusted to present to the control transformer an impedance of 10 to 50 times the internal impedance of the control transformer. Nevertheless, transistors are preferably employed in the circuit of the invention because of their long life and low power requirements, and, although the invention is illustrated and described hereinafter as employing transistors, it is to be understood that vacuum tubes may be utilized in lieu of transistors. The present invention also contemplates the provision of a novel damping circuit wherein a negative feedback signal, derived from the speed voltage developed across the motor, is applied along with the control signal through limiting resistances to the input circuit of the magnetic amplifier.

As a result of the transistor input and feedback arrangement provided by the invention, a 60 cycle motor can be operated by a single stage half-wave bridge-type magnetic amplifier, whereas, heretofore, at least two half-wave bridge stages were required; and, damping of the servo motor can be accomplished without a tachometer or separate feedback network. In addition, due to the elimination of the delay introduced by an additional amplifier stage, the corner frequency present in the arrangement of the instant invention has been extended to 60 rad./sec.

With the foregoing in mind, it is an object of the present invention to provide a new and improved magnetic amplifier having increased gain.

Another object is to obtain with a less number of magnetic amplifier stages the same gain as obtained with conventional magnetic amplifier arrangements.

Still another object is to drive a servo motor with a single half-wave magnetic amplifier stage.

It is another object of the present invention to provide a high impedance input circuit for a magnetic amplifier with no adverse effects on the amplification factor thereof.

A further object is to provide, in a magnetic amplifier, an input circuit arrangement serving as both a bias and control circuit and which permits use of a higher input impedance than heretofore possible.

A still further object is to provide electron discharge means in the input control circuit of a magnetic amplifier.

Another further object is to provide, in a magnetic amplifier, an input control circuit arrangement including electron discharge devices for presenting to the control signal source an impedance of the order of 10 to 100 times the internal impedance of the control signal source.

An important object of the invention is the provision, in a magnetic amplifier, of an input control circuit arrangement including transistors for presenting to the control signal source an impedance having a magnitude of the order of 10 to 50 times the internal impedance of the control signal source.

An essential object of the invention is to provide, in a magnetic amplifier, an input control circuit including control windings, transistors and variable resistances connected in series across the output of a control signal source whereby the input control circuit is capable of presenting to the control signal source an impedance having a magnitude of 10 to 50 times the internal impedance of the control signal source with no resultant adverse effects on the amplification factor of the magnetic amplifier.

Another important object of the invention is to provide a single stage bridge-type half-wave magnetic amplifier for driving a servo motor in a manner correlative to the phase sense and amplitude of a control signal applied to the half-wave amplifier from an error signal source.

A further important object is to drive a servo motor with a single stage bridge-type half-wave magnetic amplifier having electron discharge devices and variable reresistance means connected in series with the control windings thereof to present to the control signal source connected thereto an impedance of the magnitude of 10 to 100 times the internal impedance of the control signal source with no resultant adverse effect on the amplification factor of the magnetic amplifier.

Another further object is to drive a servo motor in a manner correlative with a control signal from an error signal source by means of a single stage half-wave bridge magnetic amplifier having transistors and variable resistors connected in series with the control windings thereof to present to the error signal source an impedance of the magnitude of 10 to 50 times the internal impedance of the control signal source with no resultant adverse effect on the amplification factor of the magnetic amplifier.

Another object of the invention resides in the provision of a novel circuit arrangement for damping a driven servo motor.

Still another object is to provide a feedback damping circuit arrangement for a servo motor driven by a magnetic amplifier wherein a negative feedback signal, derived from the speed voltage developed across the motor, is applied along with the control signal through limiting resistances to the input control circuit of the magnetic amplifier.

Another object is to provide a feedback damping circuit arrangement for a servo motor driven by a single stage half-wave bridge magnetic amplifier wherein a negative feedback signal, derived from the speed voltage developed across the motor, is applied along with the control signal through resistors to the input control circuit of the magnetic amplifier and is so arranged as to provide an effective damping current component only during the reset half-cycle of the half-wave magnetic amplifier.

A further object of the invention is to provide grounded base transistors in series circuit relation with the control windings of a single stage half-wave bridge magnetic amplifier to form an input control circuit which functions as both a reference circuit and a control circuit, the magnetic amplifier being adapted to drive a servo motor in response to a control signal applied to the magnetic amplifier control windings circuit from a control signal source.

A still further object is to provide grounded emitter transistors in series circuit relation with the control windings of a single stage half-wave bridge magnetic amplifier to form an input control circuit which functions as both a reference circuit and a control circuit, the magnetic amplifier being adapted to drive a servo motor in a manner correlative to a control signal applied to the input control circuit from a control signal source whereby the input control circuit presents to the control signal source an impedance of the magnitude of 10 to 50 times the internal impedance of the control signal source with no resultant adverse effect on the amplification factor of the magnetic amplifier.

A primary object of the present invention is the provision of a single stage half-wave bridge magnetic amplifier having the control windings thereof connected to a control signal source and the load windings thereof connected to control a servo motor in a manner correlative to the phase sense and magnitude of the control signal from the control signal source, transistors and selectively variable resistors in series circuit relation with the control windings to form an input control circuit for the magnetic amplifier that presents to the control signal source an impedance of the magnitude of 10 to 50 times the internal impedance of the control signal source, and a feedback circuit connected across the control winding of the servo motor and in series with limiting resistors and either in parallel or series with the control signal source for applying a negative feedback signal, derived from the speed voltage developed across the servo motor, along with the control signal to the magnetic amplifier input control circuit to provide damping of the servo motor.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
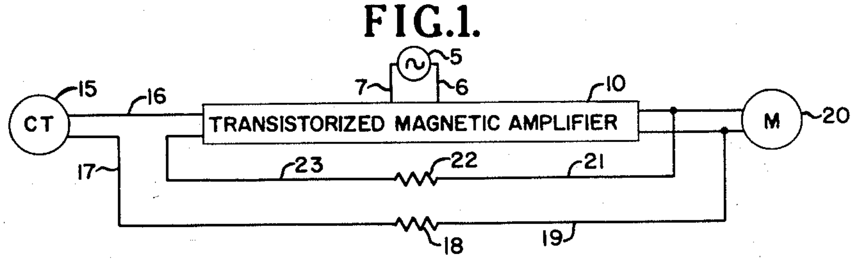
Fig. 1 shows in block diagram the circuit arrangement of a preferred embodiment of the invention.

Referring now to the drawings wherein like reference characters designate like or corresponding parts throughout the several views, there is shown in Fig. 1 (which is a block diagram of the preferred embodiment of the invention) a transistorized magnetic amplifier 10, which is preferably of the half-wave bridge-type hereinafter described with transistors in the input control circuit thereof, operatively energized from an alternating current source 5 by way of conductors 6 and 7. As is well known by those skilled in the art of half-wave bridge amplifiers, the flux level is established during a half-cycle of the supply source, which half-cycle shall hereinafter be referred to as the reset or non-conductive half-cycle since the bridge is in a non-conductive state during this half-cycle, and the bridge is conductive during the other half-cycle of the supply source, which half-cycle shall hereinafter be referred to as the conductive half-cycle. A servo motor 20, of the two-phase induction type, is connected to the output of the amplifier 10 and controlled thereby in a manner correlative with a control signal applied to amplifier 10 from control signal source 15 which may include a control transformer CT. Damping of the servo motor 20 is accomplished by means of a feedback circuit connected across the control winding of motor 20 through conductors 21 and 19 to supply a negative feedback signal along with the control signal to the input of amplifier 10, the negative feedback signal being derived from the speed voltage developed across the motor 20 as it is driven by amplifier 10 in response to a control signal from source 15. The feedback circuit is shown as being connected in series with control source 15 and consists of lead 16, control source 15, lead 17, current limiting resistor 18, conductor 19, the output of amplifier 10 appearing across the control winding of motor 20, lead 21, current limiting resistor 22, and conductor 23 connected in series circuit relation with conductors 16 and 23 connected across the input of amplifier 10. Although the feedback circuit is illustrated as being connected in series with the control source, it is to be understood that this is only by way of illustration and that the invention may be practiced by employing a feedback circuit connected in parallel with the control source across the input circuit of the amplifier.

As the motor 20 is driven by the output of amplifier 10 in response to a control signal, a sinusoidal voltage is induced in the control winding of motor 20, this sinusoidal waveform having the amplifier output superimposed thereon during one of its half-cycles which half-cycle may be either the positive or negative half-cycle thereof, depending upon the polarity of the amplifier output. The current of the sinusoidal induced voltage is limited by resistors 18 and 22 and applied to the input of amplifier 10 through source 15 along with the control signal. As will subsequently become more apparent from the description hereinafter, that half-cycle of the induced voltage having the output superimposed thereon occurs during the conductive half-cycle of the bridge and when the input circuit is in a non-conductive state. Therefore, the input circuit presents an open-circuit to the half-cycle of the induced voltage having the superimposed output signal and thus prevents the output signal fed back from affecting the magnetic amplifier. On the other hand, the succeeding half-cycle of the induced voltage occurs during the reset half-cycle when the input control circuit is conductive and thereby introduces a damping current component in the bridge to provide damping of the motor. In this manner, a feedback arrangement is provided wherein an effective damping current component occurs only during the reset half-cycle of the half-wave magnetic amplifier thereby eliminating any interference during the conductive or output half-cycle of the bridge.

The operation of the system of Fig. 1 will now be described with reference to Fig. 4 of the drawings on which is shown the waveforms present in the system during various stages of operation thereof. As the A.C. source 5 supplies operating potential, shown in Fig. 4(A) as $f$ and which may be either 60 c.p.s. or 400 c.p.s., to magnetic amplifier 10, the input circuit containing the control windings is energized during the reset half-cycles $l$—$m$, $n$—$o$, and $p$—$q$ as shown in Fig. 4(B) to establish the flux level in the reactors of amplifier 10, which flux level determines the firing angle of the reactors during the conducting half-cycle of the bridge that occurs during the half cycles $k$—$l$, $m$—$n$, and $o$—$p$ as shown in Fig. 4(C). In the absence of a control signal, the reactors in the bridge reach saturation of fire at the same time so that there is no output. When a control signal is applied, the bridge is unbalanced and produces during the conductive half-cycle an output which is correlative in phase sense and magnitude with the amplitude and phase sense of the control signal. The output signals are shown in the shaded areas $g$, $g'$, $g''$ in Figs. 4(C) and 4(D) and are indicated as being of positive polarity. If the control signals applied to the input were reversed, the output signals $g$, $g'$, $g''$ would be reversed from the polarity shown. The output signals $g$, $g'$, $g''$ appear across the control winding of motor 20 to rotate the motor which rotation induces in the motor control winding a sinusoidal voltage illustrated as $h$ in Fig. 4(D). The voltages shown in Fig. 4(D) also appear in the feedback circuit, but, due to the fact that the signals $g$, $g'$, $g''$ occur during the bridge's conductive half-cycles $k$—$l$, $m$—$n$, and $o$—$p$, the input circuit presents an open-circuit to the fed back half-cycles containing the signals $g$, $g'$, $g''$ and thus blocks these signals from affecting the bridge. The half-cycles of the fed back voltage occurring during the reset half-cycles $l$—$m$, $n$—$o$, and $p$—$q$ contain only the induced voltage component which provides an effective negative feedback damping voltage only during the reset half-cycles as illustrated in Fig. 4(E). It is to be noted that with a positively polarized control signal, the effective feedback voltage is of negative polarity. If the control signal is of negative polarity, the output $g$, $g'$, $g''$ and the induced voltage would be reversed from that shown in Fig. 4(D), and the effective damping voltage would be of positive polarity. Therefore, it is apparent that the feedback circuit provides an effective damping signal which is of opposite polarity to the applied control signal and is therefore a negative feedback signal relative to the applied control signal.

Figure 2:
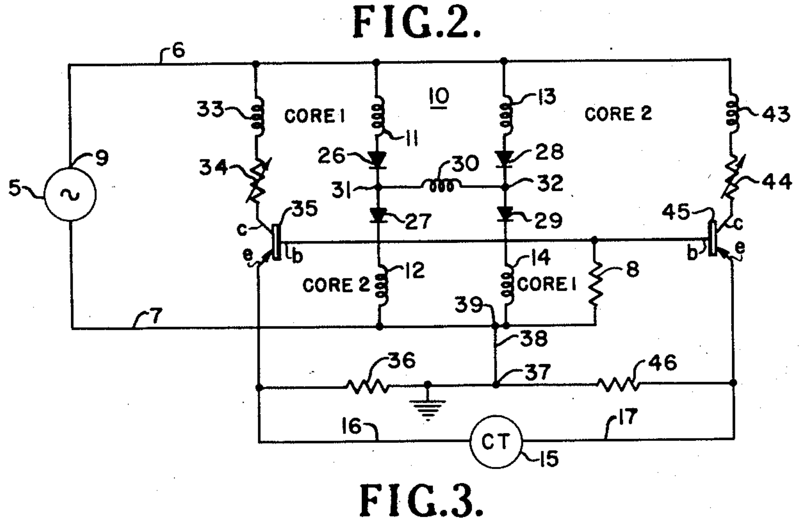
Fig. 2 is a schematic diagram of a bridge-type magnetic amplifier illustrating the high impedance input control circuit with grounded-base transistors.

Referring now to Fig. 2, wherein is shown a schematic circuit of a half-wave bridge magnetic amplifier 10 having transistors in the input control circuit, the bridge circuit comprises load or power windings 11, 12, 13 and 14 and rectifiers 26, 27, 28 and 29, the latter being preferably of the selenium type. Load windings 11 and 14, which constitute one pair of opposing legs in the bridge circuit, are wound on one reactor core designated core 1, and load windings 12 and 13, which constitute the other pair of opposing legs of the bridge, are wound on a second reactor core designated core 2. As is conventional, cores 1 and 2 are preferably so formed as to provide a closed magnetic loop and are preferably of the rectangular hysteresis loop type. It is preferable to wind the load windings which form opposing legs of the bridge circuit on the same core since, for balanced operation, the load windings which form opposing legs must act together. Alternatively, each of the load windings may be wound on separate reactors. A load 30, which may be the control winding of a two-phase servo motor, is connected across the output terminals 31 and 32 of the bridge whereby the motor may be driven in a manner correlative with the magnitude and sense of a control signal applied to the magnetic amplifier.

In half-wave circuitry, the non-operating half-cycle of the power supply voltage, hereinafter referred to as the flux setting half-cycle, is available for the purpose of establishing control. During the flux setting half-cycle, the bridge circuit is inactive and its affect upon the control source may be neglected.

The power supply source 5, which is connected across the bridge circuit through conductors 6 and 7 so as to energize cores 1 and 2 during one half-cycle thereof, is also utilized to supply the reference or bias current. The combination bias and control circuit of the present invention comprises control windings 33 and 43 disposed on cores 1 and 2, respectively. Control windings 33 and 43 are each connected in series with variable resistors 34 and 44, respectively, and with the collector-emitter path of transistors 35 and 45, respectively, the bases thereof being grounded through biasing resistor 8 and junction 39 which is connected to grounded terminal 37 through lead 38. The transistors 35 and 45 employed in Fig. 2 are of the PNP type. If desired, NPN type of transistors can be utilized by reversing the collector and emitter electrode connections in the circuit, as is well known to those skilled in the art.

Rectifiers 26 to 29 are each phased so that current flows through the bridge only during the one half-cycle of the source 5 when terminal 9 is positive, the collector-emitter paths of the PNP type transistors 35 and 45 being arranged so that current flows through the control circuit during the succeeding half-cycle of source 5. The resistors 34 and 44 are adjusted so that the current flowing through the control circuit establishes proper operating flux level in the saturable reactor cores 1 and 2 under zero signal conditions, and simultaneously the adjustment may be made so that the control circuit presents to control source 15 an impedance of 10 to 50 times the internal impedance of control source 15.

The control signal from source 15 is applied differentially through conductors 16 and 17 and across resistors 36 and 46 to the emitter electrodes of transistors 35 and 45. Conduction through the transistors is thus controlled selectively in accordance with the amplitude and polarity of the control signal from source 31 applied differentially to the emitters of transistors 35 and 45, and consequently the amplitude of the reference flux established in cores 1 and 2 by control windings 33 and 43, respectively, is differentially varied in accordance with the amplitude of the control signal. In this manner, the control flux is established in cores 1 and 2 and load current flows through load 30 during the conducting half-cycle of the bridge, in a direction and magnitude depending upon the amplitude and polarity of the applied control signal. In the absence of a control signal, the bridge is balanced and quiescent current flows down the sides of the bridge so that the resultant current flow through load 30 is zero. However, when a control signal is applied to the emitters of transistors 35 and 45 differentially, conduction through transistors 35 and 45 is varied so as to thereby differentially vary the flux during the flux setting half-cycle of the magnetic amplifier. During the succeeding conducting half-cycle of the amplifier, cores 1 and 2 will saturate at a point during the power supply voltage cycle dependent upon the level of the flux preset in the cores. After one of the cores saturates, and before the other core saturates, current flows through the load 30 in a direction dependent upon which of the cores saturates, the bridge being rebalanced after both cores saturate. Although the input control circuit is hereinabove described as employing transistors, it is to be understood that vacuum tubes may readily be employed in lieu of transistors, in which case the control circuit impedance may be varied between 10 to 100 times the internal impedance of control source 15.

Figure 3:
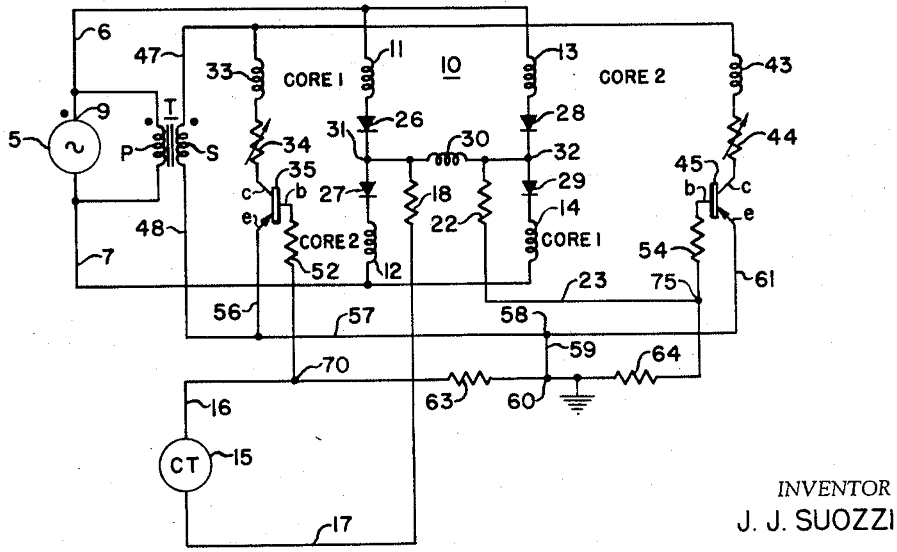
Fig. 3 illustrates the schematic circuit arrangement of a bridge-type magnetic amplifier employing grounded-emitter transistors in the input control circuit and a negative feedback circuit in series with the control signal source.

Referring now to Fig. 3, there is shown a half-wave bridge magnetic amplifier similar to the amplifier of Fig. 2, like reference numerals designating corresponding components, the amplifier of Fig. 3 having grounded emitter transistors in the control circuit and additionally employing a feedback network for deriving a damping voltage from across the load 30 which is the control winding of a servo motor to be driven by the amplifier. The operating potential is applied to the bridge from A.C. source 5 through leads 6 and 7, and the control circuit is energized from source 5 through a transformer T of which the primary winding P and secondary winding S are so arranged that the dotted ends thereof are of the same polarity as the polarity of the power source at terminal 9 as indicated by the dot. In other words, when terminal 9 is positive which shall hereinafter be referred to as the positive half-cycle, the dotted ends of windings P and S are positive; and, alternatively, when terminal 9 is negative which shall hereinafter be referred to as the negative half-cycle, the dotted ends of windings P and S are negative. The transformer T is preferably of the 1:1 ratio type but may be either a step-down or step-up transformer, at the discretion of the designer.

The rectifiers 26—29 are phased so that the bridge is conductive during the positive half-cycle of power supply 5, and the PNP transistors 35 and 45 have their collector and emitter electrodes connected so as to be conductive during the negative half-cycle of source 5. In this manner, the operating flux level, as determined by the adjustment of resistors 34 and 44, is established in cores 1 and 2 during the negative half-cycles of source 5, and load current flows through the bridge during the positive half-cycle of source 5, the magnitude and direction of the load current depending upon the amplitude and polarity of the applied control signal.

The control signal from source 15 appearing across resistors 63 and 64 is applied through biasing resistors 52 and 54 to the bases of transistors 35 and 45 to selectively control conduction of the transistors. Although Fig. 3 employs grounded emitter transistors with the control signal applied to the base electrodes, it is to be understood that grounded base transistors with emitter electrodes connected to receive the control signal, as illustrated in Fig. 2, may be used in the circuit of Fig. 3.

A damping feedback signal derived from the speed voltage developed across load 30 as the servo motor is driven, is applied to the control circuit from one end of load 30 through current limiting resistor 22, lead 23 and resistor 54 to the base electrode of transistor 45 and from the other end of load 30 through current limiting resistor 18, lead 17, control source 15, lead 16 and resistor 52 to the base electrode of transistor 35. Although the feedback circuit is illustrated as being in series with control source 15, the feedback circuit may be modified so as to be in parallel with control source 15 merely by disconnecting resistor 18 from lead 17 and by connecting resistor 18 to junction 70 and lead 17 to junction 75. As described hereinbefore, as the motor is driven in response to load current in load 30, an induced sinusoidal voltage appears across load 30 and is fed back to the control circuit by the feedback network. But, since the half-cycle of the induced voltage containing the superimposed load current occurs during the conductive half-cycle of the bridge or, in other words, the non-conductive half-cycle of the control circuit and is suppressed due to the control circuit presenting an open-circuit thereto, only the half-cycle of the induced voltage occurring during the reset or flux setting half-cycle is effective to provide a damping current component in the amplifier. As in Fig. 2, vacuum tubes may be substituted for transistors 35 and 45.

Figure 4:
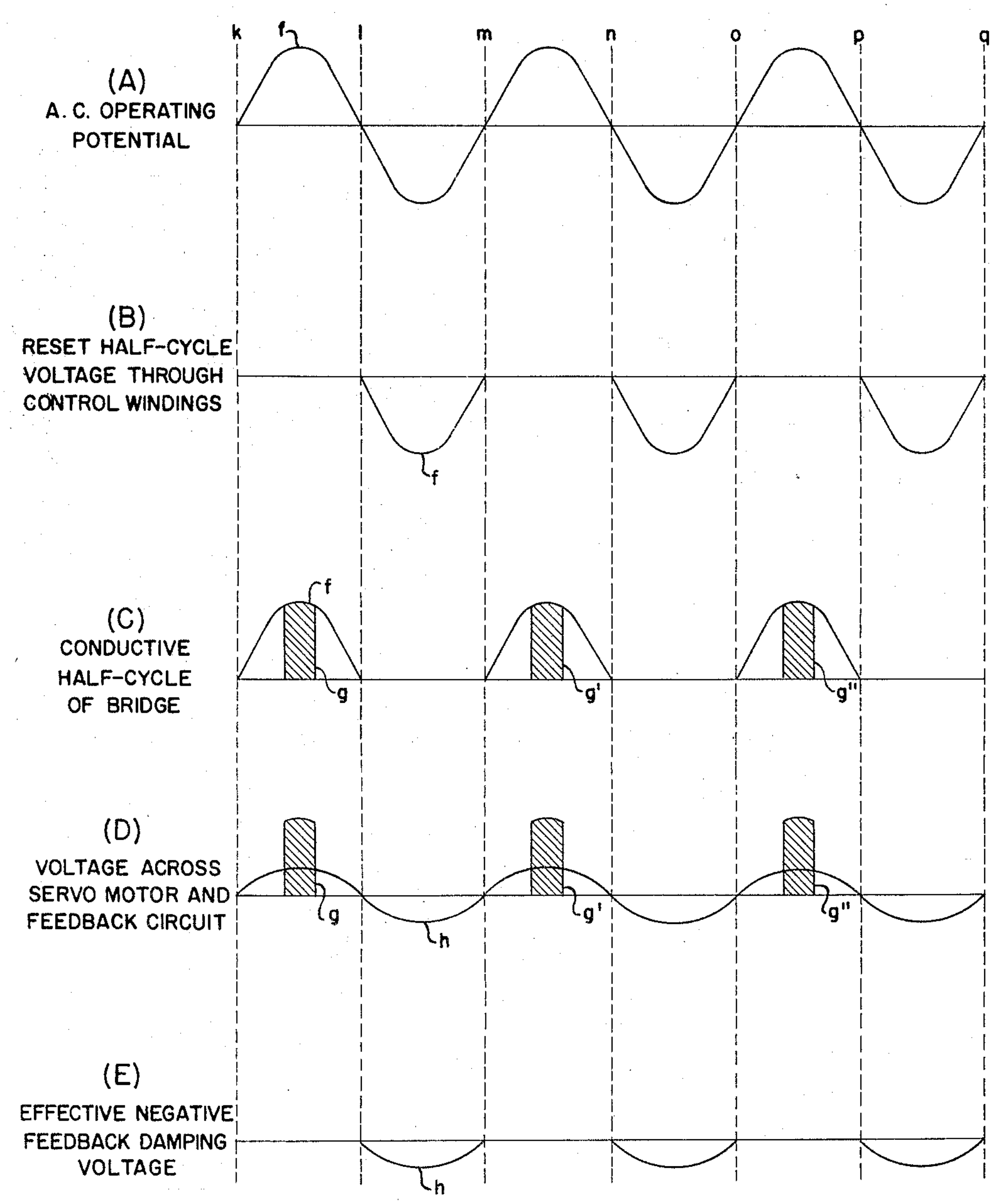
Fig. 4 illustrates the waveforms present in various portions of the invention arrangement during different stages of operation.

In the operation of Fig. 3 and referring to Fig. 4 concurrently therewith, the bridge circuit is energized from source 5 with an alternating current potential *f* (Fig. 4(A)). During the negative half-cycles *l—m*, *n—o*, and *p—q* of potential *f* (Fig. 4(B)), current flows through the transistors 35 and 45 and control windings 33 and 13 to establish the operating flux level of the cores 1 and 2 as determined by resistors 34 and 44. During the positive half-cycles *k—l*, *m—n*, and *o—p* of potential *f* (Fig. 4(C)), the bridge conducts and fires at a firing angle as determined by the operating flux levels preset during the preceding half-cycles. In the absence of a control signal, the bridge is balanced and no output appears across load 30. When a control signal is applied, the control M.M.F. aids the M.M.F. due to current flow through the load windings on one core and opposes the M.M.F. due to current flow through the load windings on the other core, thereby causing the cores to fire at relatively different times during each conductive half-cycle of the bridge to produce output signals *g*, *g'*, *g''* across the load 30. Thus, the output of the half-wave bridge is a unidirectional signal having a fundamental A.C. component correlative in amplitude and phase with the magnitude and polarity of the control signal.

The output appearing across load 30, which is the control winding of a servo motor, rotates the motor which rotation induces a sinusoidal voltage *h* (Fig. 4(D)) in control winding 30, the initial half-cycle of the sinusoidal voltage being of the same polarity as the output signal as shown in Fig. 4(D). If the control signal is reversed, the output signal and induced voltage are reversed from that shown in Fig. 4(D). Since the transistors 35 and 45 are so connected as to be non-conductive during the bridge's conductive half-cycles *k—l*, *m—n*, and *o—p*, the half-cycles *k—l*, *m—n*, and *o—p* of the induced voltage containing the superimposed output signals *g*, *g'* and *g''* are not passed by the control circuit and hence have no effect or control on the amplifier, whereas the half-cycles *l—m*, *n—o*, and *p—q* of the induced voltage occur during the conductive half-cycles of the transistors 35 and 45 and are conductively passed thereby to provide a negative feedback damping voltage as illustrated in Fig. 4(E).

From the foregoing, it is apparent that the invention provides a single control circuit which serves to function as both a bias and control circuit and which has a feedback electrically associated therewith to supply a negative feedback signal effective to provide a damping current component only during the conductive periods of the control circuit.

It is also apparent that the invention provides a control circuit arrangement whereby the control circuit presents to the control signal source an impedance of 10 to 50 times the internal impedance of the control source.

Moreover, it is apparent that the invention provides an arrangement whereby a single half-wave bridge amplifier is capable of driving a servo motor.

Obviously many modifications and variations of the present invention are possible in the light of the above teachings. It is therefore to be understood, that within the scope of the teachings herein and the appended claims, the invention may be practiced otherwise than as specifically described.

What is claimed as new and desired to be secured by Letters Patent of the United States is:

1. In a magnetic amplifier having a single magnetic amplification stage, the combination of reactor means with control and load windings thereon energized from an A.C. source and operable to drive a servo motor in a manner correlative with the sense and magnitude of a control signal applied to the magnetic amplifier from a control transformer of predetermined internal impedance, an input circuit energized from said A.C. source and connected directly to said transformer to receive solely the control signal therefrom to thereby establish both the operating flux level and the incremental control flux level in said reactor means, said input circuit including electron discharge means and electrical elements having a total impedance value variable within the range of 10 to 50 times said predetermined internal impedance, and a feedback circuit connected to apply a feedback damping voltage from said motor to said input circuit, said feedback voltage being derived from the speed voltage developed across said motor.

2. In the amplifier of claim 1, said electron discharge means being so arranged as to be conductive on predetermined alternate half-cycles of said A.C. source and said damping voltage providing an effective damping current component only during said predetermined alternate half-cycles.

3. In a magnetic amplifier having reactor means with control and load windings thereon energized from an A.C. source and operable to drive a servo motor in a manner correlative with the sense and magnitude of a control signal applied to the magnetic amplifier from a control signal source of predetermined internal impedance, an input circuit including electron discharge means and variable impedance means energized from said A.C. source and connected to receive the control signal from said source to thereby establish both the operating flux level and the incremental control flux level in said reactor means, and a feedback circuit connected to apply a feedback signal from said motor to said input circuit, said feedback signal being derived from the speed voltage developed across said motor, said electron discharge means comprising transistors having the emitter electrodes thereof grounded and the base electrodes thereof connected to receive the control signal from said source and the feedback signal from said feedback circuit so as to render said input circuit conductive on predetermined alternate half-cycles of said A.C. source whereby said feedback signal is effective to provide a damping current component only during said predetermined alternate half-cycles.

4. In the amplifier of claim 3, the range of said variable impedance being such that the total impedance of said input circuit may be selected to have a value within the range of 10 to 50 times said predetermined internal impedance.

5. In a magnetic amplifier having a single magnetic amplification stage, the combination of reactor means with control and load winding means thereon energized from an A.C. source, a control signal source including a transformer of predetermined internal impedance, an input circuit energized from said A.C. source and connected directly to said transformer to receive solely the control signal therefrom to thereby establish respectively therefrom the operating and control flux levels in said reactor means, said input circuit including in series said control winding means, electron discharge means and variable impedance means and being adaptable to present to said control source an impedance of the order of 10 to 50 times said predetermined internal impedance, said electron discharge means having a control electrode to which said control signal is applied, and a load circuit connected to said load winding means whereby an output signal corresponding in direction and magnitude with the phase sense and amplitude of the applied control signal from said control transformer appears across said load.

6. A claim according to claim 5, wherein said electron discharge means comprise transistors each having emitter, collector and base electrodes, the collector and emitter electrodes thereof being connected in series circuit relation with said control winding means and said variable impedance means and being so phased as to present a conductive path to said A.C. source only during predetermined alternate half-cycles thereof.

7. A claim according to claim 6, wherein the base electrodes of said transistors are connected to a point of reference potential and wherein said control source is connected to the emitter electrodes of said transistors.

8. A claim according to claim 6, wherein the emitter electrodes are connected to a point of reference potential and wherein said control source is connected to apply the control signal to the base electrodes of said transistors.

9. A claim according to claim 8, further including a feedback circuit interconnecting said load circuit and said base electrodes to thereby apply to said base electrodes a feedback signal derived from across said load circuit.

10. A claim according to claim 9, wherein said feedback circuit includes said control source in series circuit relation.

11. In combination, a magnetic amplifier having reactor means with control and load windings disposed thereon, a source of alternating current connected to said control and load windings for applying operating potential to said magnetic amplifier, a load circuit including said load windings connected in series with similarly poled unidirectional conductive devices, said devices being poled so that current flows through the load windings only during one half-cycle of said alternating current source, an input control circuit including said control windings connected in series with asymmetrical conducting means and variable impedance means, said asymmetrical means being arranged so that current flows through said control windings on the other half-cycle of said alternating current source, a control signal source of predetermined internal impedance connected to apply a control signal to said input circuit whereby said input circuit functions to establish the operating flux level and the incremental control flux level in said reactor means in response respectively to said other half-cycle of said alternating current source and said control signal, said variable impedance means being so adjustable that the total impedance of said input circuit may be selected to have a value within the range of 10 to 50 times said predetermined internal impedance, a load including the control winding of a servo motor connected across said load circuit to receive an output signal during said one half-cycle in response to said control signal, said control winding being adaptable in response to said output signal to rotate the motor in a manner correlative with the sense and magnitude of said output signal and being so disposed in the motor that rotation of the motor induces in said control winding a sinusoidal voltage having a magnitude corresponding to the speed of rotation of the motor and having an initial half-cycle corresponding in polarity to the sense of said output signal, and a feedback circuit including current limiting resistors connected across said load and coupled to said asymmetrical means for applying said sinusoidal voltage to said input circuit, the initial half-cycle of said sinusoidal voltage occurring during said one half-cycle of the alternating current source.

12. The arrangement of claim 11, wherein said magnetic amplifier is of the half-wave type with the load windings and unidirectional conductive devices being arranged to form a balanced bridge circuit.

13. The arrangement of claim 12, wherein said asymmetrical conducting means comprise transistors each having emitter, collector and base electrodes of which the collector and emitter electrodes are connected in series circuit relation with said control windings and said variable impedance means.

14. The arrangement of claim 13, wherein the emitter electrodes are connected to a point of reference potential and wherein said control source is connected to apply the control signal to the base electrodes of said transistors.

15. The arrangement of claim 14, wherein said feedback circuit is connected to said base electrodes and includes said control source in series circuit relation whereby said induced sinusoidal voltage is applied in series with the control signal to said base electrodes.

16. A magnetic amplifier arrangement comprising, in combination, a single stage half-wave magnetic amplifier including four impedance elements connected in a closed circuit to form a bridge circuit, at least two of said impedance elements comprising load windings each wound on a core of saturable magnetic material, circuit means connecting said load windings to form separate parallel branch circuits in said bridge circuit, means including a source of A.C. potential connected across said parallel branch circuits for applying an A.C. potential thereto, unidirectional conductive means connected in said branch circuits and arranged so that current flows simultaneously through the load windings only during one half-cycle of said A.C. potential, a control winding on each of said cores, asymmetrical conducting means and variable impedance means connected in series with each of said control windings to form a pair of series circuits, circuit means connecting said series circuits in parallel across said A.C. source, said asymmetrical conducting means being arranged so that current flows simultaneously through said control windings on the other half-cycle of said A.C. source, a control signal source connected to apply a control signal to said asymmetrical means whereby said pair of series circuits function to establish the operating and control flux levels in said cores in response respectively to said other half-cycle of said A.C. source and the control signal, a load circuit connected to receive an output signal from said bridge circuit during the conductive half-cycle of said load windings in response to a control signal, said load circuit including the control winding of a servo motor whereby said motor is rotated in a manner correlative with the sense and magnitude of said output signal, rotation of said motor generating across said motor control winding a sinusoidal voltage having a magnitude corresponding to the speed of rotation of the motor and having an initial half-cycle corresponding in polarity to the sense of said output signal, and a feedback circuit including limiting resistors connected across said load and coupled to said asymmetrical means for applying said sinusoidal voltage to said pair of series circuits, the initial half-cycle of said sinusoidal voltage occurring during said one half-cycle of said A.C. potential.

17. The arrangement of claim 16, wherein said asymmetrical means comprise PNP type transistors each having collector, emitter and base electrodes of which the collector-emitter path is connected in said pair of series circuits with the emitter electrode being connected to a point of reference potential, and wherein said feedback circuit is connected to said base electrodes and includes said control source in series circuit relation whereby said sinusoidal voltage is applied in series with the control signal to said base electrodes.

References Cited in the file of this patent

UNITED STATES PATENTS

| | | |
|---|---|---|
| 2,683,843 | Geyger | July 13, 1954 |
| 2,695,381 | Darling | Nov. 23, 1954 |

FOREIGN PATENTS

"Transistor Controlled Magnetic Amplifiers," R. H. Spencer, Electronics, August 1953, pp. 136–140.

Magnetic Amplifier Circuits, W. A. Geyger, January 29, 1954, pp. 192–197.

"A Transistor-Controlled Half Wave Magnetic Amplifier, J. J. Suozzi, Navord Report 2896, July 15, 1953.